United States Patent Office 3,305,497
Patented Feb. 21, 1967

3,305,497
CELLULAR POLYURETHANES PRODUCED USING A MIXTURE OF (A) CHLOROFORM AND (B) A FLUORINE SUBSTITUTED ALKANE AS THE BLOWING AGENT
John P. Stallings and Donald H. Wagner, Mentor, Ohio, assignors to Diamond Alkali Company, Cleveland, Ohio, a corporation of Delaware
No Drawing. Filed Apr. 10, 1963, Ser. No. 271,836
11 Claims. (Cl. 260—2.5)

This invention relates to polyurethane foam materials of uniformly fine, closed cell structure. More particularly, the present invention relates to non-friable polyurethane foam materials characterized by good cell structure, little or no shrinkage and absence of discoloration, and to a method of making such materials. Specifically, the present invention relates to a method for producing non-friable polyurethane foam materials of uniformly fine, closed cell structure by the reaction of a di- or polyfunctional isocyanate, a polyfunctional hydroxyl-containing material and a novel blowing agent.

Since their initial development, polyurethane foam materials have enjoyed ever increasing use in industry. Their commercial acceptance has been especially pronounced in the field of insulation as these foams exhibit superior thermal and acoustical insulating properties because of their uniform, fine, closed cell structure. They have thus been employed successfully to insulate refrigerated railroad cars, trailer trucks, storage tanks, certain types of refrigerators and freezers, and the like. In such applications, it has been possible to apply the fabricated foam in thicknesses which are 50 percent or less than that normally required with other types of insulation to maintain the same desired levels of refrigeration. By employing polyurethane foam, therefore, much less space is required by the insulating material, and a substantial increase in storage capacity can be realized.

While being extremely light, low-density materials, polyurethane foams possess great structural strength. They may be applied as a sandwish construction, i.e., laminated between panels of various compositions, or by various foam-in-place techniques to insulate wood and masonry construction. In addition to their thermal and acoustical insulating properties, these foams are excellent vapor barriers. When applied in such construction, they prevent moisture from migrating from the interior and causing undesirable conditions on the outer walls such as paint blistering, peeling, damping, and the like.

In general, polyurethane foam is produced by reacting a polyisocyanate with a polyol, namely, a compound containing two or more hydroxyl groups, such as a glycol, a polyesterpolyol, or a polyetherpolyol. The reaction is conducted usually in the presence of a catalyst as an initiator, a silicone surfactant, and with a blowing agent which is volatilized by the heat developed in the reaction. The gaseous material is then dispersed as bubbles throughout the reaction mix, thereby expanding it to its cellular form.

In one method of making cellular polyurethane products, a liquid polyol is pumped at a controlled rate through a nozzle of a foaming machine. Polyisocyanate, preferably a diisocyanate, is pumped at high pressure to the nozzle, where it contacts the stream of polyol and is thoroughly mixed therewith because of its high velocity. A small amount of water may also be introduced into the nozzle either as a stream or in admixture with the polyol. Suitable crosslinking agents and reaction catalysts, such as certain tertiary amines, are also preferably mixed with the polyester or introduced into the nozzle. A stirrer is also generally present in the nozzle to insure homogeneous mixing. From the nozzle, the material is delivered to a suitable mold, such as an open pan, which is moved in a continuous manner relative to the nozzle to provide the desired layer of viscous reactants on the bottom of the pan or mold. Polymerization starts as the materials are mixed and the semi-fluid mass is discharged to large pans. The material mixing is very important. It is important that the diisocyanate and catalyst be almost immediately and completely dispersed in the polyol. The rate of polymerization is relatively fast and the mass is shaped by the contour of the pans.

There are two general methods for the application of blowing agents in foams. In the first method, the blowing agent is carbon dioxide formed in situ by the reaction of water and isocyanate. In this method, water and polyol along with a catalyst are reacted with the isocyanate in approximately stoichiometric amounts. Carbon dioxide is evolved in the gaseous state from the time of mixing so that the bubbling and frothing occur during the mixing, discharging and shaping stages. The time and place at which release of the gas by the isocyanate occurs cannot be controlled, as it is evolved as a result of the reaction between the diisocyanate and water. While the use of $CO_2$ is effective to some extent, there are serious limitations to producing foamed polyurethanes in this manner; for instance, the need for an excess of the diisocyanate used to react with water to evolve carbon dioxide presents an economic limitation because the diisocyanate is very expensive; substituted ureas, by-products of the water-diisocyanate reaction, are formed and enter into cross-liking reactions, producing undesirable stiffness where flexible-type foam products are desired; also, the product foams with regions of high density when used in a cored mold with the result that the benefits of cored molds are lost.

In the second method a volatile liquid is used which vaporizes with the exothermic reaction of the isocyanate and polyol. Inasmuch as the volatile liquid is a source of gas for expansion of the polyurethane into a foam, much less expensive polyisocyanate is required. Also, the high density portions are eliminated, thus producing cellular polyurethanes of low density, for instance, in the range of from about 1 to 5 pounds per cubic feet, which are rigid, semi-rigid or flexible, and which have less shrinkage at low density. Further, the water otherwise required to be introduced to react with the diisocyanate is not needed, and the amount of substituted urea by-product of the water-diisocyanate reaction is thereby reduced and shrinkage upon set is appreciably less, so that lighter, reinforced articles can be made. Specific examples of volatile liquids, which have been substituted for carbon dioxide as blowing agents, include the halogen-substituted alkyl hydrocarbons containing at least one fluorine-substituted atom, such as, for instance, trichlorofluoromethane, dichlorofluoromethane, dichlorotetrafluoroethane, trichlorotrifluoroethane, and the like.

Although the use of halogen-substituted alkyl hydrocarbons, containing at least one fluorine-substituted atom, presents many advantages over the use of carbon dioxide as a blowing agent and has found wide acceptance in the manufacture of polyurethane foam materials, it has now been found that non-friable polyurethane foam materials of uniformly fine, closed cell structure can be produced using a novel blowing agent composition. The blowing agent of the present invention is a mixture of a halogen-substituted hydrocarbon containing at least one fluorine-substituted atom and a compound having the following structural formula:

$$C(X)_4$$

wherein X is selected from the group consisting of hydrogen and chlorine. The fluid blowing agent composition of the present invention presents a much more attractive alternative to either the halogen-substituted hydrocarbon containing at least one fluorine atom, or the chlorine-containing compound alone as the blowing agent. Suitable chlorine-containing compounds which may be used in combination with the halogen-substituted hydrocarbon containing at least one fluorine-substituted atom as a blowing agent include methyl chloride, methylene chloride, chloroform, and carbon tetrachloride. Of these, the preferred chlorine-containing compound is chloroform. It is to be understood that the expression "fluid composition" is meant to include the blowing agent of the present system existing either in a gaseous, gaseous-liquid (gas miscible in liquid), or liquid (mutually miscible liquids) state at room temperature, and which at reaction temperatures readily vaporizes, if in the gaseous-liquid or liquid state, and disperses as bubbles throughout the reaction mixture. By miscible is meant compatible, dispersible or soluble.

The preferred blowing agent used in the practice of the present invention is a composition comprising a mixture of chloroform and a halogen-substituted alkyl hydrocarbon, preferably a lower alkyl of about 1 to 8 carbon atoms, containing at least one fluorine-substituted atom. The chloroform generally is employed in the blowing agent composition in amounts from about 20 to 70 molar percent, preferably about 30 to 60 molar percent, with essentially the halogen-substituted alkyl hydrocarbon compound making up the balance of the blowing composition. An especially preferred mole ratio of chloroform to halogen-substituted alkyl hydrocarbon is about 1:1. An especially preferred blowing agent composition comprises a mixture of chloroform and trichlorofluoromethane. It is generally desired that from about 5 to 20, preferably about 10 to 16 percent by weight of the blowing composition, based on the total weight of the polyol-polyisocyanate materials, be used in preparing the polyurethane foams.

It has been found that the use of the blowing agent composition of the present invention, besides being more economically attractive than blowing agents presently in use, results in polyurethane foam materials characterized by excellent surface, non-friability, e.g., essentially no surface crumbling upon aging, excellent cellular formation, essentially no shrinkage upon curing, production of a lower volatility of the polyisocyanate-polyol formulation, and a low-volume swell of the finished foam on humid aging.

In the formation of polyurethane foam materials, it is prefered that the foam formulations comprise true solutions, that is, the blowing agent is appreciably soluble in the polyol or the polyisocyanate, although a uniform and relatively stable dispersion of the blowing agent composition may also be used, providing a relatively uniform end product. A true solution, however, provides a method of controlling the release of the gas because release is accelerated by the heat of the condensation reaction. The heat of reaction breaks the small globules or reduces the solubility of the blowing agent composition in the polyol or polyisocyanate to cause blowing, usually after the polyurethane reaction has proceeded far enough to trap the released gas so that the stiffening of the polyurethane occurs before or just about the time the gas is released so that the gas remains trapped even in surface layers. The fluid compositions, comprising the blowing system of the present invention, have been found to form true solutions, rather than emulsions or dispersions, with commercial polyol-polyisocyanate systems described hereinbefore and thus gives a uniform release of the blowing agent when the vaporization temperature of the blowing agent is reached.

Foams produced may be either rigid, semi-rigid or flexible. Rigid foams are obtained by using a large proportion of or entirely branch-chain polyether-polyols, preferably of rather low average molecular weight, and polyhydric alcohols. The semi-rigid foams are obtained by using a proportion of linear polyether-glycols and diols in the reaction mixture while the flexible foams are obtained by using an even larger proportion of linear reactants. Semi-rigid and flexible foams may also be obtained by using high average molecular weight branched polyether polyols. Moreover, diisocyanates, triisocyanates and isocyanates having more than three isocyanato groups may be employed in making the foams. For example, one may react a linear polyether glycol with a diisocyanate to obtain a chain extended isocyanate-terminated prepolymer which then may be reacted with glycerol, pentaerythritol, etc. in the presence of excess isocyanate to form a rigid network. Another way is to react a branch chain polyether-polyol with excess diisocyanate and complete the crosslinking with glycerol or more branch chain polyether polyol. Various combinations of the reactants can be employed to obtain the desired network, crosslinking, degree of rigidity or flexibility, and the like.

Examples of useful branch chain polyether-polyols containing a plurality of functional hydroxyl groups are the reaction products of glycerol, trimethylol propane, pentaerythritol, 1,2,6-hexane triol, phloroglucinol, trimethylol benzene, trimethylol phenol, styrene-vinyl alcohol copolymer, sucrose, sorbitol and similar polyhydric materials reacted with glycols and the like such as propylene glycol, butylene glycol, mixtures of ethylene and propylene glycol and the like in the presence of catalysts with removal of water. They also may be reacted with alkylene oxides such as propylene oxide, butylene oxide, mixtures of ethylene oxide and propylene oxide, and the like. Mixtures of the monomers forming the polyether polyols as well as the mixtures of the branched chain polyether polyols themselves may be used.

Examples of linear or substantially linear polyether polyols are those polyalkylene ether glycols derived from alkylene oxides, glycols, heterocyclic ethers and other materials by polymerization, copolymerization, and the like. For example, tetrahydrofuran may be polymerized, in the presence of catalytic amounts of fluorosulfonic acid to make a polytetramethylene ether glycol having the formula:

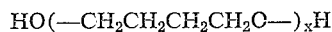

where $x$ is an integer. Ethylene oxide-propylene oxide mixtures, propylene oxide and the like may be used to make other polyalkylene ether glycols. Glycols may be polymerized in the presence of mineral acid, sulfonic acid or fuller's earth. Still other methods well known to the art may be used in the preparation of polyalkylene ether glycols.

The linear polyether polyols may be represented by the formula:

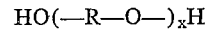

where R is an algylene or aryl alkylene group and where $x$ is an integer. Moreover, R can be a mixture of alkylene or an alkylene group, for example, alternating groups or blocks of ethylene and propylene radicals, i.e., a polyethylene-propylene ether glycol. Examples of substantially linear polyalkylene ether glycols are polyethylene-propylene ether glycol, polyneopentylene ether glycol, polytetramethylene ether glycol, polypentamethylene ether glycol, polyhexamethylene ether glycol, poly 4-phenyl hexamethylene ether glycol, poly 1,6-heptamethylene ether glycol, and the like. To provide for water resistance the polyethers should have at least three carbon atoms between oxygen (ether) linkages. However, some of the carbon chains can consist of 2 carbon atoms so long as there are a predominating number of carbon chains having 3 or more carbon atoms. The average molecular weight of these polyether polyols may vary from about 180 to about 3,500 or more.

An especially preferred polyol for use in the production of polyurethane foam materials, using the novel blowing agent composition of the present invention, is a polyether polyol having a substantial percentage of halogen incorporated therein, and fully described in copending application, Serial No. 216,075, filed August 10, 1962, hereby incorporated by reference. The halogenated polyether polyol can be prepared by reacting, with the ultimate loss of water, a ring-halogenated xylylene dihalide such as, for instance, tetrachloroxylylene dichloride and a polyol, such as glycerol.

The reaction proceeds initially in accordance wtih the following general representative equation to yield, as the product, a mixture comprised of ring-chlorinated polyether polyol isomers as shown:

(I)
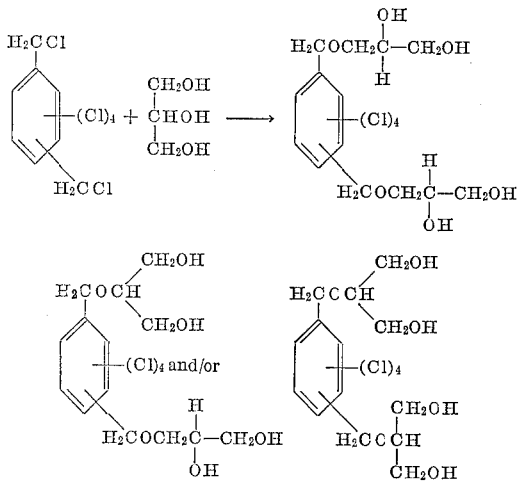

Also present in the initial product, in addition to unreacted glycerine and by-product hydrogen chloride, may be dimers and trimers of any or all of the isomeric polyether polyols illustrated. As the reaction proceeds, the by-product hydrogen chloride reacts with the products of Equation I, with the chlorine replacing some of the hydroxyls of the ether chains of the initially formed compounds. The water formed in this reaction is removed by condensation. The final product, therefore, is a mixture comprised of the thus-chlorinated polyether polyol isomers of Equation I, which may be represented by the structures:

II)
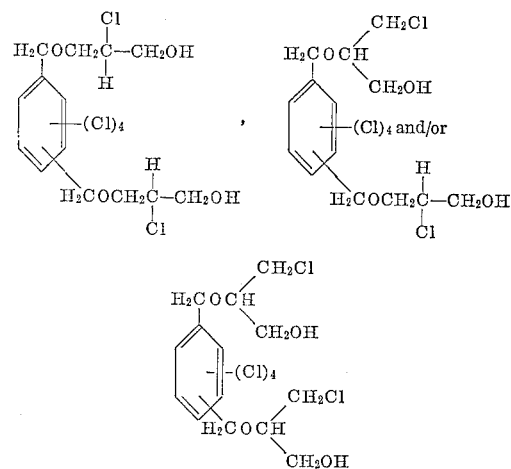

as well as the numerous other chlorinated isomeric polyether polyols possible from such a hydrochlorination process. The reaction product likewise contains various amounts of dimers and trimers of any or all of said chlorinated isomeric polyether polyols, free glycerine, glycerine chlorohydrins and less than 1% free water.

A critical factor involved in the reaction is the quantity of water condensate removed therefrom, which quantity may be predetermined by calculations based on the molar quantity of tetrachloroxylylene dichloride employed. Removal of water condensate in prescribed amounts is critical since the reaction may be closely controlled by this variable and polyether products having the desired properties for optimum performance in foaming operations are obtained. Thus, by removing, for each mole of tetrachloroxylylene dichloride used in the reaction, from 1.5 to 4.7 moles, and preferably about 2.5 to 3.5 moles of water condensate, polyethers are prepared having an average molecular weight and a hydroxyl number within the desired range.

In the reaction, optionally conducted in an inert atmosphere, the preferred ring-chlorinated xylylene dichloride employed is a,a',2,4,5,6-hexachloro-m-xylene, but other isomers of this tetrachloroxylylene dichloride, such as a,a',2,3,5,6-hexachloro-p-xylene, or a,a',3,4,5,6-hexachloro-o-xylene, may also be employed to give chlorinated hydroxyl-rich polyether products yielding in reaction with a polyisocyanate satisfactory flame-resistant, rigid foams. Additionally, mixtures of these chlorinated xylylene dichlorides and other chlorinated aromatic compounds, such as ring and side-chain chlorinated pseudocumene, mesitylene, alkyl naphthalenes, durene, and the like may be advantageously reacted.

In addition to glycerol, which is the preferred polyol employed, other polyols containing at least three hydroxyl groups may also be used. Such materials include pentaerythritol, trimethylol propane, 1,2,4-butanetriol and 1,2,6-hexanetriol. Polymeric polyols, e.g., polypropylene triols and polyols, poly (butylene glycol), poly (styrene glycol), poly (epichlorohydrin), and the like are also satisfactory. Also employed may be mixtures containing glycerol and (1) polyols such as trimethylolpropane, 1,2,4-butanetriol, or (2) other polyhydroxy compounds such as sugars, reduced sugars or alkylene oxide adducts thereof.

It is likewise possible to obtain satisfactory chlorinated polyether polyol products by employing varying quantities of polyol in proportion to the amount of tetrachloroxylylene dichloride incorporated therein. For example, from about 2 to 5 moles of polyol or polyol mixture for each mole of chloroxylylene dichloride may generally be reacted. However, by employing in a preferred ratio about 2½ to 3½ moles of polyol for each mole of tetrachloroxylylene dichloride, polyether products are obtained which (1) can be most effectively cross-linked; (2) contain sufficient chlorine to impart flame-resistance to foams prepared therefrom; and (3) are of such low viscosity that they may be handled easily in even "one-shot" foaming operations, i.e., techniques wherein all of the separate ingredients of the foam formulation may be blended together immediately before foaming is effected, or as is more generally used, techniques wherein some of the components are premixed at a time substantially before foaming.

The reaction is carried out preferably in the presence of an azeotroping agent to aid in the removal of the water condensate formed, said agent generally used being either an aliphatic or aromatic low-boiling hydrocarbon such as a n-hexane, octane, toluene, xylene, and the like.

The tetrachloroxylylene dichloride-polyol reaction is carried out for a time sufficient to recover the critical quantity of water condensate, i.e., about 1.5 to 4.7 moles per mole of the dichloride. This time usually varies from about 3 to 19 hours. However, reaction times of 5 to 9 hours are typical when an azeotroping agent is used.

The chlorinated polyether polyol products have an average molecular weight of about 300 to 450 and contain a high percentage of combined chlorine, i.e., about 36 to 38 percent. They have hydroxyl numbers within the range of about 300 to 600, preferably within the range of 350 to 450 [as determined by the method outlined in Siggia, S. "Quantitative Organic Analysis via Functional Groups," 2nd edition, Wiley & Sons, Inc., p. 9 (1958)]. They may usually contain up to about 0.9 percent free water and exhibit Brookfield viscosities at 25° C. generally within the range of about 50,000 to 300,000 centipoises. The novel polyether polyols described in copending application, Ser. No. 216,075, when reacted with a polyisocyanate, impart to the rigid polyurethane foam materials flame-resistant characteristics. Thus, if the preferred polyols are used, there is no need to add flame retardants to the polyurethane foams.

The isocyanates employed are polyisocyanates having 2, 3 or more reactive isocyanato groups. Examples of these isocyanates include hexamethylene, tolylene 2,4-, tolylene 2,6-, diphenyl methane, p,p'-methaphenylene, p-phenylene, naphthalene, dimethyl diphenyl methane and bitolylene diisocyanates and the like, and mixtures thereof such as an 80–20 mixture of 2,4- and 2,6-tolylene diisocyanates or a 65–35 mixture of 2,4- and 2,6-tolylene diisocyanates, naphthalene triisocyanates or other polyisocyanates. Especially preferred for use is crude diphenylmethane 4,4'-diisocyanate.

Isocyanates may be employed such as those obtained by the reactions of tolylene diisocyanate with glycol, glycerol, and the like to make materials having urethane linkages and polyisocyanato end groups. Another useful isocyanate is "Papi-1" having the general formula:

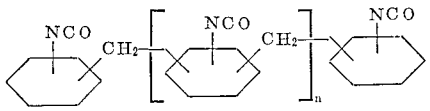

where $n$ has an average value of about 1. Also, mixtures of polyisocyanates can be used.

While only highly branched polyols and polyisocyanates may be used in making rigid foams, a hydroxyl crosslinking polyol may be added to the reaction mixture to form the best network for foam formation, preferably a hydroxyl-terminated crosslinking polyol. The crosslinking material should preferably have at least 3 hydroxyl radicals and may be added to an initial mixture of the polyether polyol and polyisocyanate, or can be added to the polyether polyolpolyisocyanate prepolymer after its formation. Sufficient of the crosslinker is added to react with the unreacted isocyanate groups to complete the formation of the polyurethane foam. Examples of useful materials are "Hyprose SP-80," a sucrose reacted with eight equivalents of propylene oxide to give a compound having about 36 carbon atoms and 8 hydroxyl groups (The Dow Chemical Co.), trimethylol propane, glycerol, 1,2,6-hexane triol, pentaerythritol, N,N,N',N'-tetrakis (2-hydroxyl propyl) ethylene diamine, and other branch chain polyols as well as the branch chain polyether polyols mentioned hereinbefore. Where more flexible products are desired, some of the crosslinker may be linear or substantially linear such as 1,4-butanediol, 1,5-pentanediol, and polypropylene ether glycol, or high molecular weight polyethers, etc.

Catalysts which generally may be used as either an organic tin compound such as stannous octoate or dibutyl tin dilaureate, or a tertiary amine, e.g., triethylene diamine, tetrabutyl butane diamine, and the like. Depending upon the particular foam formulation and the technique employed to fabricate the foam product, either type catalyst may be incorporated effectively. Stannous octoate may generally be employed in an amount ranging between about 0.1 to about 0.50 percent by weight of the total foam formulation, while about 0.2 to about 0.4 percent of the amine type catalyst, by weight, generally may be used.

A surfactant, for instance silicone oil, may be incorporated in rigid foam systems as a foam stabilizer, i.e., to aid in the development of the fine, closed-cell structure desired and also to keep said cell structure from disintegrating before it has been strengthened by curing.

Other compounding ingredients may also be employed in making the polyurethanes of this invention such as wetting agents, emulsifiers, carbon black, titanium dioxide, mica, wood pulp, silica, color pigments and dyes, paraffin oil, castor oil, fire-resistant materials, such as antimony oxide, if the preferred polyol is not used, fungicides, anti-degradants, and the like.

Also, inert inorganic type gases such as $CO_2$ and $N_2O$ may be mixed and or dissolved with the fluid blowing agent composition. If the reaction proceeds too fast, it may be desirable to add small amounts of polycarboxylic aliphatic acids to slow the reaction. Other ways to control the rate of reaction where the polyether polyol and polyisocyanate tend to react too fast is to wash the material or otherwise remove traces of catalysts and the like which would tend to speed the reaction.

The polyurethane foam can be prepared by thoroughly mixing the polyol with the blowing agent, surfactant, and the like regardless of the particular foaming technique being employed. The catalyst component may or may not be admixed at this time with the polyol so formulated. For example, in "one-shot" foaming techniques, or when using aged formulated polyol, the catalyst is usually incorporated therein. When fabricating foam in a typical foaming machine, however, the catalyst is frequently admixed with said polyol mixture along with the polyisocyanate component but via a separate metering line. Irrespective of the fabricating technique used, the polyisocyanate is usually mixed with the other foam ingredients just prior to the foaming operation since the reaction between the polyisocyanate and the hydroxyl-containing polyether proceeds with the liberation of heat, reducing the solubility of the blowing agent composition in the polyurethane-forming material and expansion of the foam mass follows.

In addition to the typical "one-shot" foaming techniques described hereinabove, a quasi-propolymer formulating method also may be employed. Such a technique involves reacting a portion of the polyether component with an excess of the polyisocyanate component at some time substantially prior to the foaming operation. Such pre-polymers, containing residual free isocyanate groups, may be used alone or may be mixed with other pre-polymers, such as a pre-polymer of a trial and diisocyanate.

In the foam formulation, sufficient amounts of the polyol and polyisocyanate are employed to achieve the desired chain extension, crosslinking, network formation, and the like. The polyisocyanate compound generally is used in excess with respect to the polyol component, i.e., in an amount contributing from about 0.5 to about 5, preferably about 1.00 to 1.20 with an especially preferred ratio of from 1.05 to 1.10 isocyanate equivalents for each polyether hydroxyl equivalent employed. For example, with 125 grams, or the hydroxy equivalent weight of a polyether having a hydroxyl number of 450, from about 138 to 165 grams of crude diphenyl methane 4,4'-diisocyanate are used. By formulating the polyether and polyisocyanate components in the ratios as described, the most desirable foam products are produced.

Depending upon the particular foam formulation and especially the type and amount of catalyst incorporated therein, the time required to convert the foam mass into the fully expanded foam product may vary appreciably, as for example, in a time period varying from about 5 seconds up to about 10 minutes. Thereafter, the expanded foam material is air-cured for about 30 minutes before it is stored or used.

The foamed products of the present invention may have densities of from about 1 up to about 30 or more; preferably from about 1 to 5 pounds per cubic foot. Composed essentially of a uniform, fine, closed-cell structure, they exhibit excellent foam properties including a tough, non-friable surface, excellent abrasive resistance, compressive strength varying between about 8 to about 57 pounds per square inch, and K-factors (factor of thermal conductivity) as low as about 0.100 B.t.u./in./sq. ft./hr./° F. Even after aging for about 90 days, the foam shows a K-factor-time curve essentially the same as that of a trichlorofluoromethane-blown foam. They possess good dimensional stability, low thermal conductivity, permanent resistance to moisture absorption or hydrolysis and excellent chemical resistance. The preferred foam products of this invention exhibit non-burning characteristics and contain an average chlorine content of from about 18 to 23 percent.

In order that those skilled in the art may better understand the present invention and the preferred methods by which it may be practiced, the following specific examples are offered:

EXAMPLES

Part A

*Preparation of a chlorinated polyether polyol.*—Into a twelve-liter, three-necked, round bottom flask equipped with two water traps connected to reflux condensers, a thermometer, a mechanical stirrer, a heating mantle and nitrogen inlet and outlet tubes are charged thirty-seven hundred and seventy grams (12 moles) of a,a',2,4,5,6-hexachloro-m-xylene, 200 ml. (2.5 moles) of toluene and thirty-five hundred and eighty-eight grams (39 moles) of glycerine. The mixture is agitated and the system is purged with nitrogen. The agitating mixture is then heated, while continuing to pass nitrogen at a rate of about 0.002 cubic feet per minute through the flask, up to a temperature of about 155° C. at which temperature the toluene/water azeotrope begins to reflux. The reaction is continued while regulating the heat input so that the temperature does not rise above 180° C. until about 500 ml. of water are removed by distillation at which time both toluene and water are removed together. In a total reaction time of about 3½ hours, about 667 ml. of water (about 3.1 moles per mole of a,a',2,4,5,6-hexachloro-m-xylene) and the toluene are recovered. After water and solvent removal, the reaction is continued with heating for an additional hour. After cooling, the reaction product is poured into a suitable container. As determined by freezing point depression in dioxane, the average molecular weight of the reaction product is about 315. It has a hydroxyl number of about 424, contains about 36% of combined chlorine and about 0.4% free water. At 25° C., the product exhibits a Brookfield viscosity of about 95,000 centipoises.

Part B

*Production of polyurethane foam.*—The polyurethane foams of the present invention are prepared by placing a silicone oil surfactant into a metal container which has been heated to about 60° C. The sides of the container are coated with the heated oil by tilting and rotating the container. Chlorinated polyether polyol, the product of Part A, a catalyst and the blowing agent are then added to the container and thoroughly mixed by using, as an agitator a 2-inch Conn impeller operated at about 1,000 r.p.m.'s. Crude diphenylmethane 4,4'-diisocyanate (NCO eq.=139) is added and blended into the mixture of the other ingredients by mixing rapidly for about 30 seconds. The foam mix is quickly poured into a mold wherein expansion of the mix is effected. The resulting foam product is allowed to stand for 24 hours before being tested for physical properties. The examples are conducted under the conditions specified in Table I, presented below, for instance, the reactants, blowing agents, amounts, catalyst, reaction time, etc. The rigid foam products are examined and tested, and the results found are also shown in Table I.

TABLE I

| Run No. | Polyol Active H Equivalent [1] | Equivalents of Polyol | Equivalents of Diisocyanate | Catalyst (grams) | Surfactant [4] (grams) | CCl$_3$F (moles) | CH$_2$Cl$_2$ (moles) | CHCl$_3$ (moles) | CCl$_4$ (moles) | Rise Time (secs.) | Density lbs./cu. ft. | Surface Friability |
|---|---|---|---|---|---|---|---|---|---|---|---|---|
| 1 | 132 | 3.10 | 3.35 | [2] 10 | 20 | 0.80 | | 0.50 | | 25 | 1.31 | No. |
| 2 | 132 | 3.10 | 3.35 | [2] 10 | 20 | 0.65 | | 0.65 | | 25 | 1.34 | No. |
| 3 | 132 | 3.10 | 3.35 | [2] 8.5 | 10 | 0.575 | | 0.369 | | 35 | 1.78 | No. |
| 4 | 132 | 5.00 | 5.40 | [2] 12.7 | 15 | 0.708 | | 0.708 | | 35 | 1.88 | No. |
| 5 | 132 | 5.00 | 5.40 | [2] 12.7 | 15 | 0.608 | | 0.808 | | 35 | 1.83 | No. |
| 6 | 129 | 5.00 | 5.40 | [3] 8.1 | 16 | 0.704 | | 0.704 | | 30 | 2.10 | No. |
| 7 | 129 | 5.00 | 5.40 | [3] 6.5 | 16 | 0.704 | | 0.704 | | 65 | 2.07 | No. |
| 8 | 132 | 5.00 | 5.40 | [2] 12.7 | 15 | 1.255 | | | | 30 | 1.86 | Yes. |
| 9 | 129 | 5.00 | 5.40 | [2] 12.7 | 15 | | | 1.255 | | 30 | | No. |
| 10 | 125 | 0.65 | 0.70 | [2] 2.5 | 4.0 | | 0.26 | | | 35 | 2.18 | No. |
| 11 | 125 | 0.65 | 0.70 | [2] 2.5 | 4.0 | | | | 0.26 | 30 | 1.94 | No. |

| Run No. | Compressive Strength (p.s.i.) | Compressive Strength [5] (p.s.i.) | Compressive Modulus (p.s.i.) | Compressive Modulus [5] (p.s.i.) | Percent Volume Change | Flame Resistance [6] | Flame Resistance [5] | K Factor, B.t.u./in./sq. ft./hr./° F. | Foam Appearance | |
|---|---|---|---|---|---|---|---|---|---|---|
| | | | | | | | | | Cells | Shrinkage |
| 1 | 21.5 | 19.8 | 608 | 608 | +0.89 | Non-Burning | Non-Burning | 0.214 | Fine | None. |
| 2 | 21.8 | 22.5 | 714 | 675 | +4.6 | do | do | 0.223 | do | Do. |
| 3 | 33.6 | 34.1 | 1,193 | 1,311 | −0.78 | do | do | 0.266 | do | Do. |
| 4 | 43.6 | 38.7 | 1,326 | 1,295 | +0.37 | do | do | 0.204 | do | Do. |
| 5 | 42.8 | 38.6 | 1,352 | 1,233 | −0.26 | do | do | 0.213 | do | Do. |
| 6 | 31.6 | 38.0 | 755 | 1,105 | +7.01 | do | do | 0.109 | do | Do. |
| 7 | 23.8 | | 1,110 | | +7.39 | do | do | 0.104 | do | Do. |
| 8 | 30.8 | 39.2 | 939 | 1,067 | +1.09 | do | do | 0.206 | do | Slight Shrinkage. |
| 9 | | | | | | | | | | Shrinks badly. |
| 10 | | | | | | | | | | Do. |
| 11 | | | | | | | | | | Do. |

[1] Active Hydrogen Equivalent=56.100/OH No.+Acid No.+62.4 (Percent H$_2$O).
[2] Dibutyl Tin Dilaurate.
[3] Stannous Octoate.
[4] Silicone Oil.
[5] After Humid Aging, 158° F. at 100% humidity for one week.
[6] Tested for flame resistance in accordance with A.S.T.M. rate-of-burning test (D-1692-59T).

The above results show that, when a combination of trichlorofluoromethane and chloroform is used as the blowing agent (Runs 1 to 7), non-friable, non-burning, rigid polyurethane foams characterized by uniformly fine, closed-cell structures and no shrinkage are produced; whereas when trichlorofluoromethane is used as the sole blowing agent (Run 8), a friable foam which exhibited slight shrinkage is produced. Also, when either methylene chloride (Run 10), chloroform (Run 9), or carbon tetrachloride (Run 11) is used as the sole blowing agent in the preparation of the polyurethane foam, a product is obtained which shrinks badly upon standing.

It is to be understood that, although the invention has been described with specific reference to particular embodiments thereof, it is not to be so limited, since changes and alterations therein may be made which are within the full intended scope of this invention as defined in the appended claims.

It is claimed:

1. The method of making a polyurethane foam which comprises reacting a polyether polyol with an organic polyisocyanate in the presence of from about 5 to 20 percent by weight, based on the total weight of said polyurethane foaming material, of a fluid composition comprising about 20 to 70 molar percent of chloroform and about 80 to 30 molar percent of a halogen-substituted lower molecular weight alkane, wherein the alkane contains 1 to 8 carbon atoms and at least one substituted fluorine atom, based on the weight of said fluid composition, and at a temperature sufficient to effect reduction of solubility of said fluid composition in said polyurethane foaming material and to form a polyurethane product.

2. The method of claim 1 wherein the polyol is a halogen-containing polyether selected from the group consisting of

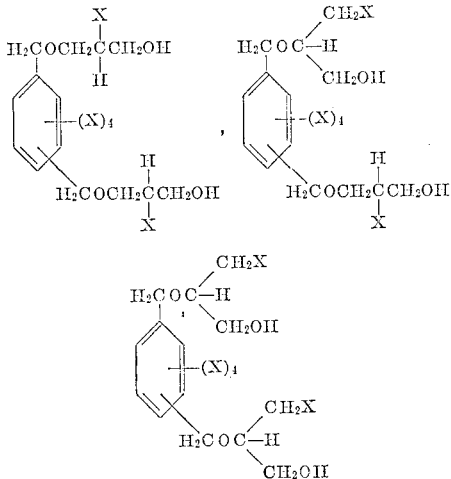

wherein X is halogen, and dimers and trimers of said polyethers, said composition having an average molecular weight within the range of 300 to 450, a hydroxyl number within the range of 300 to 600, an absolute viscosity of less than 300,000 centipoises at 25° C., and containing at least 36 percent by weight of combined halogen.

3. The method of claim 2 wherein the halogen is chlorine.

4. The method of claim 1 wherein the fluid composition is present in the reaction mixture in an amount from about 10 to 16 percent by weight.

5. The method of claim 1 wherein the fluid composition comprises a mixture of $CHCl_3$ and $CCl_3F$.

6. The method of claim 5 wherein $CHCl_3$ and $CCl_3F$ are present in an equimolar ratio.

7. A polyether polyol-organic polyisocyanate-polyurethane foam comprising closed cells containing trapped therein a vaporized composition comprising about 20 to 70 molar percent of chloroform and about 80 to 30 molar percent of a halogen-substituted lower molecular weight alkane, wherein the alkane contains 1 to 8 carbon atoms, and at least one fluorine-substituted atom, based on the weight of said composition.

8. The foam of claim 7 wherein the polyol is a halogen-containing polyether selected from the group consisting of

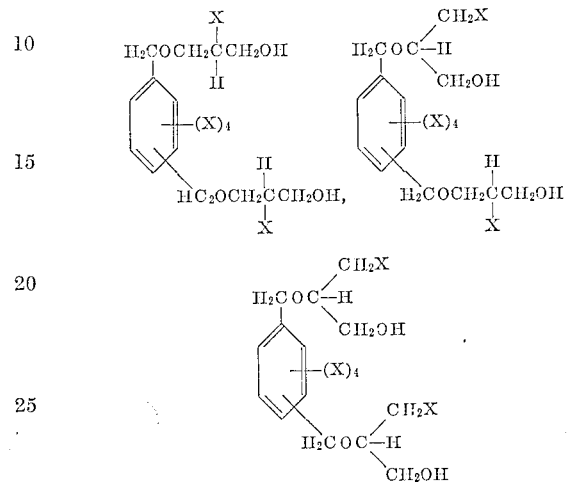

wherein X is halogen, and dimers and trimers of said polyethers, said composition having an average molecular weight within the range of 300 to 450, a hydroxyl number within the range of 300 to 600, an absolute viscosity of less than 300,000 centipoises at 25° C., and containing at least 36 percent by weight of combined halogen.

9. The foam of claim 8 wherein the halogen is chlorine.

10. The foam of claim 7 wherein the vaporized composition comprises a mixture of $CHCl_3$ and $CCl_3F$.

11. The foam of claim 10 wherein $CHCl_3$ and $CCl_3F$ are present in an equimolar ratio.

References Cited by the Examiner
UNITED STATES PATENTS

| | | | |
|---|---|---|---|
| 2,799,694 | 7/1957 | Ross et al. | 260—611 |
| 2,983,692 | 5/1961 | D'Alelio | 260—2.5 |
| 3,072,582 | 1/1963 | Frost | 260—2.5 |
| 3,076,784 | 2/1963 | Schulte Huermann et al. | 260—77.5 |
| 3,091,551 | 5/1963 | Robertson | 260—2.5 |

DONALD E. CZAJA, *Primary Examiner.*

J. J. KLOCKO, *Assistant Examiner.*